US005670119A

United States Patent [19]

Formica et al.

[11] Patent Number: 5,670,119

[45] Date of Patent: Sep. 23, 1997

[54] HOLDER FOR A TEST TUBE

[75] Inventors: Philip Michael Formica; Wolfgang Evers, both of Lübeck; Carsten Wruck, Ratzeburg, all of Germany

[73] Assignee: Drägerwerk AG, Lübeck, Germany

[21] Appl. No.: 512,386

[22] Filed: Aug. 8, 1995

[30] Foreign Application Priority Data

Oct. 14, 1994 [DE] Germany .......................... 44 36 770.8

[51] Int. Cl.$^{6}$ ................................ G01N 1/22; B01L 9/00

[52] U.S. Cl. ................................ 422/104; 422/86; 422/88

[58] Field of Search ................................ 422/86, 88, 99, 422/102, 104; 435/287.6, 288.1, 304.1

[56] References Cited

U.S. PATENT DOCUMENTS

| | | | |
|---|---|---|---|
| 4,159,304 | 6/1979 | Shono | 422/104 |
| 4,389,372 | 6/1983 | Lalin | 422/88 |
| 4,459,266 | 7/1984 | Lamoreaux | 422/86 |
| 4,758,521 | 7/1988 | Lushbaugh et al. | 436/128 |
| 4,923,806 | 5/1990 | Klodowski | 436/39 |
| 5,069,879 | 12/1991 | Leichnitz et al. | 422/86 |
| 5,139,746 | 8/1992 | Rabenecker | 422/104 |
| 5,174,964 | 12/1992 | Klodowski et al. | 422/88 |
| 5,186,899 | 2/1993 | Drago et al. | 422/104 |
| 5,328,664 | 7/1994 | Ponsy | 422/84 |

FOREIGN PATENT DOCUMENTS 38 44 097 C2 12/1988 Germany .

OTHER PUBLICATIONS

Detector of gas impurities in air—has pipe accommodated in elastic transparent jacket hermetically connected to hard material tip; Med–Biol Problems, Abstract SU 1386–891–A (Sep. 26 1985).

*Primary Examiner*—Harold Pyon
*Attorney, Agent, or Firm*—McGlew and Tuttle

[57] ABSTRACT

A holder for a test tube with a test robe tip that can be opened, with a tube, which accommodates the test tube at least partially, and whose tube end has a projection pointing toward the test tube tip in the area of the test tube tip. The handling steps needed to open the test tube are reduced by providing a projection beginning from the tube end, with a cross-sectional area decreasing continuously over at least a section. A displacement zone is provided between the projection and the test tube in such a manner that the projection can be brought into contact with the test tube tip upon pressure on the tube end.

9 Claims, 1 Drawing Sheet

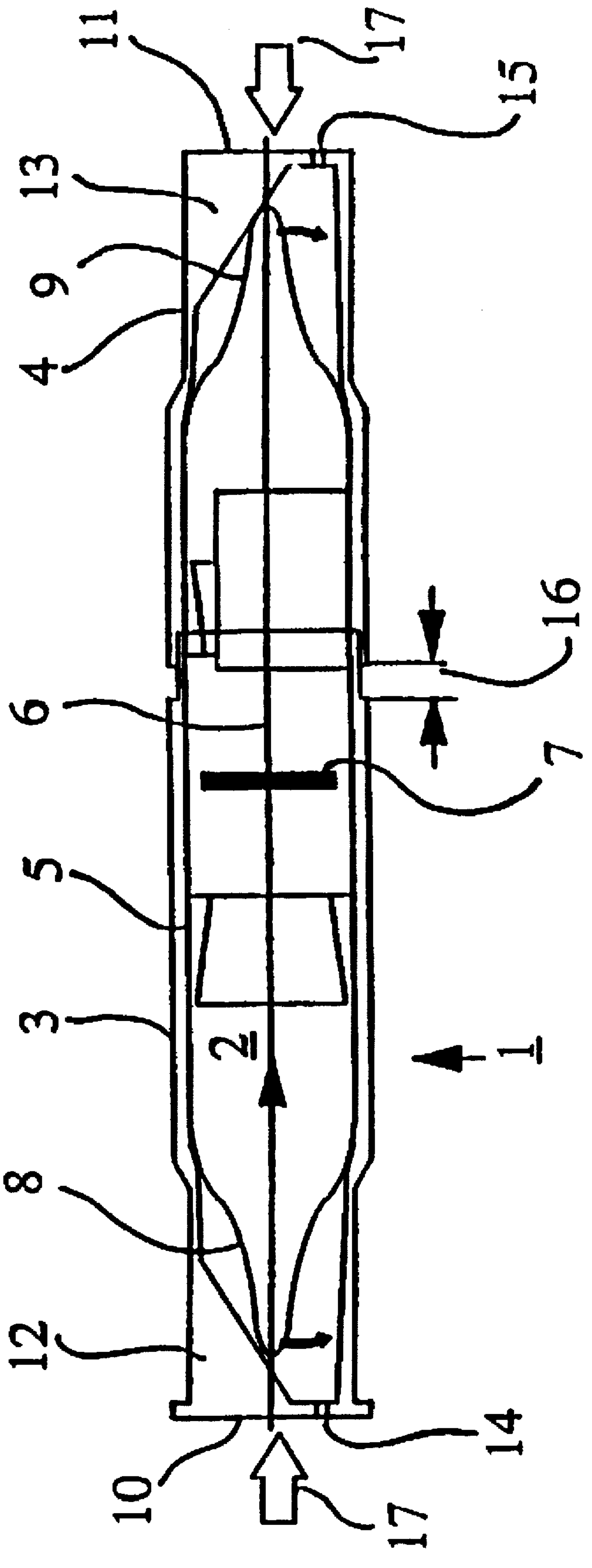
11
17
15
13
9
4
16
6
7
5
3
2
1
8
12
14
10
17

HOLDER FOR A TEST TUBE

FIELD OF THE INVENTION

The present invention pertains to a holder for a test tube with a test tube tip that can be opened, with a tube which at least partially accommodates the test tube and whose tube end has a projection pointing toward the tip of the test tube in the area of the tip of the test tube.

BACKGROUND OF THE INVENTION

A holder of this type has become known from SU-A 13 86 891. The holder consists of a tube made of an elastic material, which is pushed onto the test tube and has a connection piece made of a solid material, which is pushed onto the tube in the area of the tip of the test tube. The internal diameter of the connection piece is dimensioned such that the connection piece can be pushed onto the cylindrical part of the tip of the test tube and comes into contact in the transition area between the tip and the glass body containing the detection reagent. To open the test tube, the connection piece is first rotated to scratch the test tube and subsequently to break off the tip. This process is to be repeated on the opposite side of the test tube.

The disadvantage of the prior-art holder is that two handling steps, namely, first the scratching of the test tube to create a predetermined breaking point, and then the lateral breaking off of the tip of the test tube, are necessary to open the test tube.

A multiple holder for test tubes, in which closing strips, which are located on both sides of the ends of the test tube and can be folded out laterally, are used as break-off aids, has become known from DE-C 38 44 097. After opening one side of the test tube, a connection piece, which is connected to a pump delivering the flow of gas sample, is placed on the opened ends. The opposite side of the test tube is subsequently opened by folding out the corresponding closing strip.

The disadvantage of the prior-art multiple holder is that there is a risk of injury at the open broken edges of the test tube during the folding out of the closing strips.

SUMMARY AND OBJECTS OF THE INVENTION

The primary object of the present invention is to improve a holder of the above-described class such that the handling steps for opening the test tube are reduced.

This object is attained by the projection having, beginning from the tube end, a cross-section area decreasing continuously at least over a section and by a displacement zone being provided between the projection and the test tube in such a manner that the projection can be brought into contact with the tip of the test tube in the case of pressure on the tube end.

The advantage of the present invention is essentially that the tip of the test tube is shorn off laterally by exerting pressure on a tube end of a tube pushed onto the test tube. To do so, a projection, which points in the direction of the tip of the test tube, is provided in the area of the tube end, and the said projection has its greatest cross-sectional area at the rear part of the tube end, and this cross-sectional area decreases in the direction of the test tube. The projection is dimensioned such that it extends at least up to the central axis of the test tube. By means of a displacement zone, the projection can be displaced in relation to the test tube and can be brought into contact with the tip of the test tube by exerting pressure on the tube end. The displacement zone may be designed such that the tube can be displaced together with the projection on the glass body of the test tube, or that the tube consists of an elastic material, which is deformable by pressure acting on the tube end, at least in a section between the projection and the glass body of the test tube.

The projection is preferably designed as a wedge. The wedge may have a continuously changing cross-sectional area, or it may be designed as a stepped wedge. The wedge may also extend partially or completely over the circumference of the tube end and have the contour of an inner cone or of an inner cone section.

A sampling opening is preferably provided in the area of the tube end, so that the test tube can be placed directly into a gas delivery unit together with the holder.

The tube is advantageously designed as a first tube section, which can be pushed on from the tips of the test tube, with a first projection, and as a second tube section with a second projection, wherein the tips of the test tube can be opened simultaneously by exerting pressure on the two tube ends of the tube sections. The lengths of the tube sections are selected to be such that a distance is formed between the mutually opposite surfaces of the tube sections when the tube sections have been pushed onto the test tube. The tips of the test tube are shorn off simultaneously and the tube sections abut against each other upon pressure on the tube ends of the tube sections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic view of the holder for a test tube according to the invention.

DETAILED DESCRIPTION OF THE PREFERRED EMBODIMENT

The only FIGURE shows a holder 1 for a test tube 2, comprised of a first tube section 3 and a second tube section 4, which are pushed onto the test tube 2 on both sides. The test tube 2 has, within a glass body 5, a detection layer 7 extending along a central axis 6 for indicating the percentage of the compound being sought in a glass body. The gas sample 5 is closed on both sides with test tube tips 8, 9, which are located on the central axis 6. The cylindrical tube sections 3, 4 are closed by means of tube ends 10, 11, and projections, namely wedges 12, 13. The wedges 12, 13 have, beginning from the tube ends 10, 11, a continuously tapering cross-sectional contour (at least in a functional portio of the projections) and are located within the tube sections 3, 4 in the area of the test tube tips 8, 9. In addition, sampling openings 14, 15 for passing a gas sample through the test tube 2 are provided at the tube ends 10, 11. The length of the tube sections 3, 4 is selected to be such that a distance 16 acting as a displacement zone is present between the tube sections 3, 4 after pushing onto the test tube 2.

The holder 1 according to the present invention is handled as follows: Upon pressure on the tube ends 10, 11 along the arrow 17, the tube sections 3, 4 are displaced against each other along the glass body 5, and the wedges 12, 13 touch the test tube tips 8, 9. When the pressure is increased, the test tube tips 8, 9 are shorn off laterally, and the tube sections 3, 4 abut against each other, as a result of which the distance 16 is reduced to zero.

While a specific embodiment of the invention has been shown and described in detail to illustrate the application of the principles of the invention, it will be understood that the invention may be embodied otherwise without departing from such principles.

What is claimed is:

1. A holder for a test tube, the test tube including a test tube tip that can be opened, the holder comprising:

a first tube section with first tube section end;

a second tube section, said second tube section cooperating with said first tube section to form a holder tube which accommodates the test tube at least partially, said first tube section end having a projection pointing toward the test tube tip in an area of said test tube tip, said projection having, beginning from said first tube section end, a cross-sectional area decreeing continuously at least over a section of said projection; and said first lube section having a first tube section engaging portion amid said second tube section having a second tube section engaging portion, said first robe section engaging portion and said second tube section engaging portion cooperating to define displacement zone means with said first tube section and said second tube section engaged, said displacement zone means providing a displacement distance with respect to an axial direction of said test tube tip, said displacement distance being greatest in an initial position, upon initially engaging said first tube section and said second tube section, and approaching zero in a displaced position for displacing said projection into contact with said test tube tip upon applying pressure on said holder tube first tube end and displacing said first tube section and said second tube section to said displaced position.

2. A holder according to claim 1, wherein said second tube section has a second tube section end with a another projection pointing toward another test tube tip in an area of the another test tube tip, said another projection having, beginning from said second tube section end, a cross-sectional area decreasing continuously at least over a section of said another projection.

3. A holder according to claim 2, wherein a sampling opening is provided in said first tube section adjacent to said first tube section end and a sampling opening is provided in said second tube section adjacent to said second tube section end.

4. A holder according to claim 2, wherein said projection is provided as a wedge and said another projection is provided as a wedge.

5. A holder according to claim 4, wherein a sampling opening is provided in said first tube section adjacent to said first tube section end and a sampling opening is provided in said second robe section adjacent to said second tube section end.

6. A holder for a test tube, the test tube including a test tube tip which can be opened and an opposite test tube tip that can be opened, the holder comprising:

a holder tube which accommodates the test tube at least partially, said holder tube having a first tube section with a first tube end and a second tube section with a second tube end;

a projection at said first tube end pointing toward said test tube tip in an area of said test tube tip, said projection having, beginning from said first tube end, a cross-sectional area which decreases continuously at least over an active portion;

another projection at said second tube end pointing towards said opposite test tube tip in an area of said opposite test tube tip, said another projection having, beginning from said second tube end, a cross-sectional area decreasing substantially continuously at least over a functional portion; and displacement zone means defined between said projection and said another projection for providing a zone for displacing, with respect to an axial direction of said test tube tip, said first tube end relative to said second tube end between an initially connected position and a displaced connected position and for bringing said projection and said another projection into contact with said first test tube tip and said opposite test tube tip, respectively, upon application of pressure on said first tube end and said second tube end and displacing said first tube end relative to said second tube end to said displaced position.

7. A holder according to claim 6, wherein a sampling opening is provided in said first tube section adjacent to said first tube end and a sampling opening is provided in said second tube section adjacent to said second tube end.

8. A holder according to claim 6, wherein said projection is provided as a wedge and said another projection is provided as a wedge.

9. A holder according to claim 8, wherein a sampling opening is provided in said first tube section adjacent to said first tube end and a sampling opening is provided in said second tube section adjacent to said second tube end.

* * * * *